United States Patent
Kazlas et al.

[11] Patent Number: 5,919,606
[45] Date of Patent: Jul. 6, 1999

[54] LIQUID CRYSTAL CELL AND METHOD FOR ASSEMBLY THEREOF

[75] Inventors: Peter T. Kazlas, Lafayette; Douglas J. McKnight; Kristina M. Johnson, both of Boulder, all of Colo.

[73] Assignee: University Technology Corporation, Boulder, Colo.

[21] Appl. No.: 08/853,463

[22] Filed: May 9, 1997

[51] Int. Cl.$^6$ ................................ G02F 1/1339
[52] U.S. Cl. .................. 430/321; 349/153; 349/156; 349/157
[58] Field of Search .................. 430/321, 311, 430/319; 349/153, 155, 156, 157

[56] References Cited

U.S. PATENT DOCUMENTS

| | | | |
|---|---|---|---|
| 3,863,322 | 2/1975 | Leupp et al. | 29/580 |
| 3,909,930 | 10/1975 | Gurtler | 29/592 |
| 4,874,461 | 10/1989 | Sato et al. | 216/23 |
| 4,983,023 | 1/1991 | Nakagawa et al. | 350/344 |
| 4,989,955 | 2/1991 | Ito et al. | 350/344 |
| 5,054,890 | 10/1991 | Hanyu et al. | 350/344 |
| 5,089,905 | 2/1992 | Sasaki et al. | 359/64 |
| 5,204,766 | 4/1993 | Taniguchi et al. | 359/81 |
| 5,238,435 | 8/1993 | TeVelde | 445/24 |
| 5,361,152 | 11/1994 | Harada et al. | 359/80 |
| 5,378,298 | 1/1995 | Williams et al. | 156/275.5 |
| 5,448,131 | 9/1995 | Taylor et al. | 313/309 |
| 5,499,127 | 3/1996 | Tsubota et al. | 359/80 |
| 5,499,128 | 3/1996 | Hasegawa et al. | 349/155 |
| 5,515,191 | 5/1996 | Swirbel | 359/81 |
| 5,801,797 | 9/1998 | Iida et al. | 349/73 |
| 5,838,414 | 11/1998 | Lee | 349/157 |

OTHER PUBLICATIONS

O'Mara, William C., "Liquid Crystal Flat Panel Displays: Manufacturing Science & Technology", (1993): pp. 86–199.
"TechNotes: Advanced Electronics Resins: Processing Guide for Photo–Imageable BCB".

*Primary Examiner*—John A. McPherson
*Attorney, Agent, or Firm*—Fleshner & Kim

[57] ABSTRACT

A method and apparatus for assembly of liquid crystal cells with a thin (<4 pm), uniform (±100 $\mu$m) cell gap. The method can be used for the assembly of either individual or multiple liquid crystal cells on a single substrate. The method uses a photo-definable polymeric resin as both an edge seal and a spacer and has several important steps: spin-coating defines the cell gap, patterning defines the cell structure, and thermocompression bonding provides adhesion. The method for assembling liquid crystal cells having a thin, uniform cell gap, comprises the steps of: diluting a photo-definable polymeric resin with a solvent; applying the diluted photo-definable polymeric resin on a substrate; patterning the diluted photo-definable polymeric resin by selective exposure to a light; and selectively removing portions of the diluted photo-definable polymeric resin based upon exposure to the light resulting in a resin pattern.

30 Claims, 17 Drawing Sheets

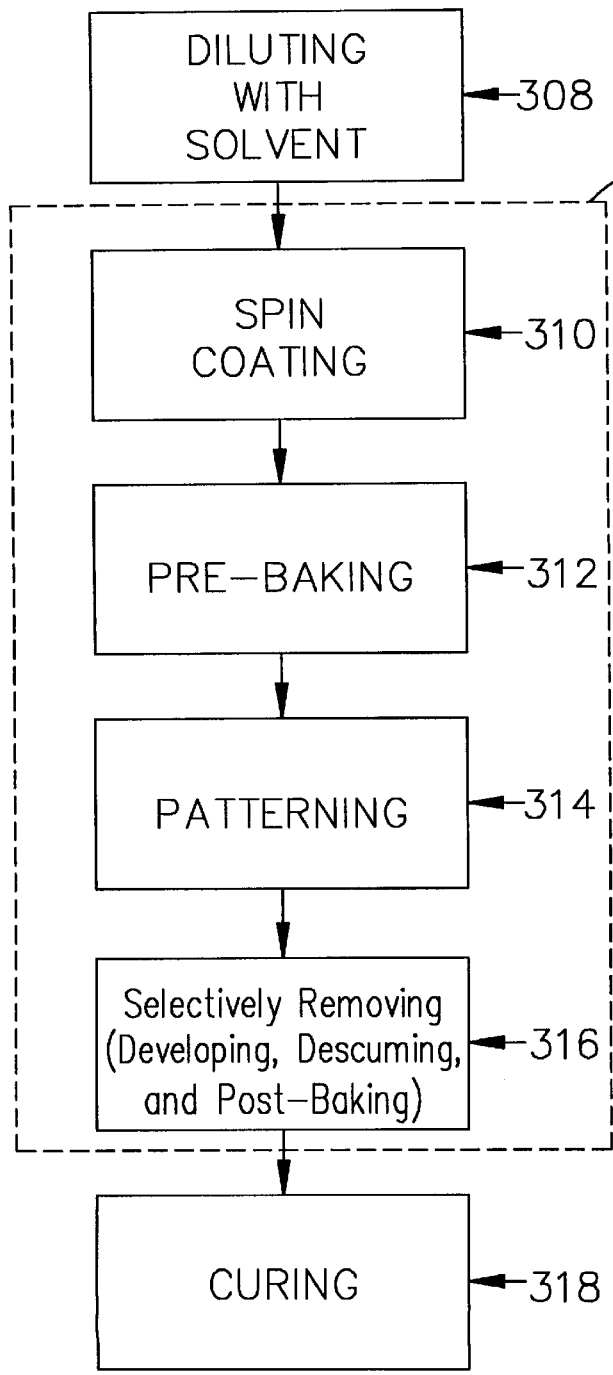
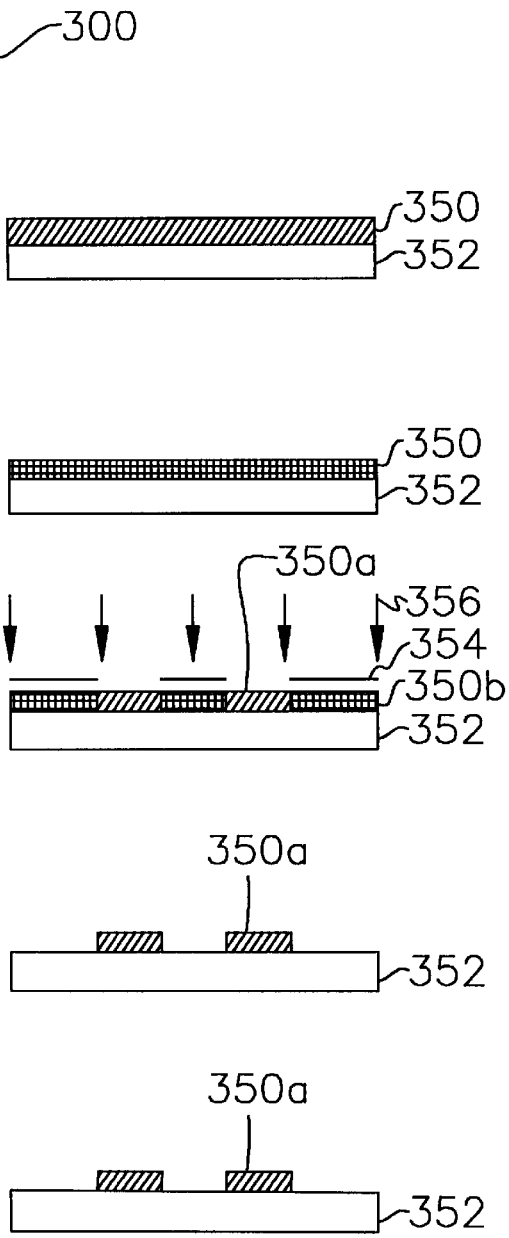
FIG. 3A                    FIG. 3B

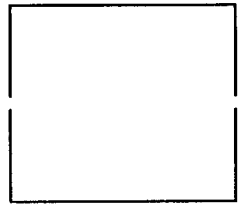
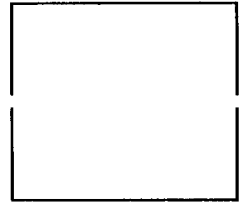
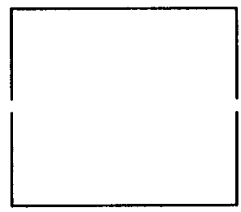
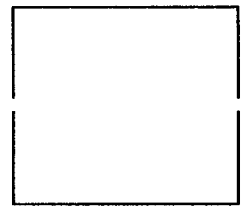
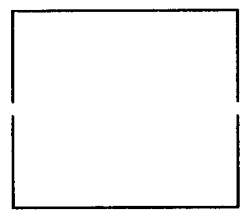
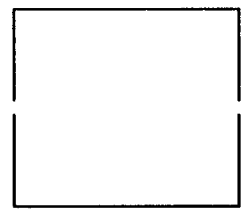
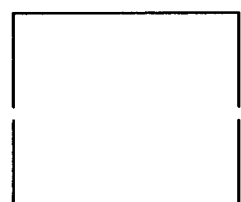
CU VGA Die Mask (.7" diag)
FIG. 8C

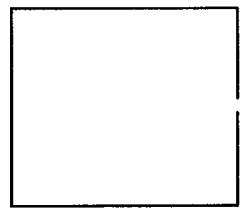 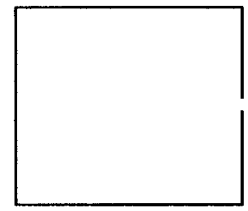
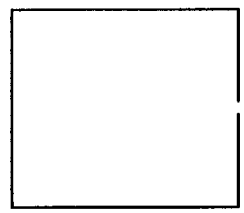 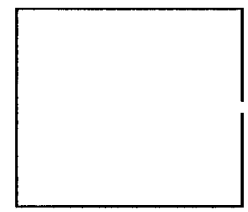
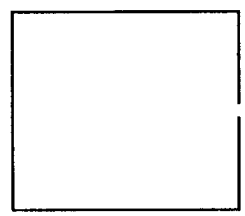 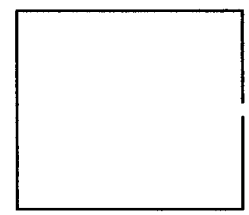
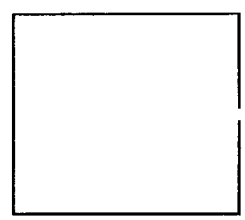 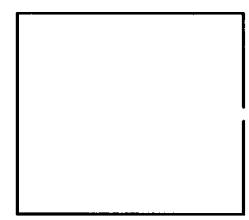
FIG. 8D 2" Wafer Mask (.35" diag, 0.75 mm)

2" Wafer Mask (.25" diag, 0.5mm)

Liquid Crystal Test Cells

| | Cell #1 | Cell #2 |
|---|---|---|
| Liquid crystal | BDH-E7 | ZLI2140-100 |
| $\Delta n$ | .22 | .13 |
| LC alignment | $SiO_x$, ↑↔ | PI↑↓ |
| Cell gap (μm) | .9 | 1.9 |
| Array | single cell | 36 cells |
| Cell diameter (mm) | 12 | 2.5 |
| Edge seal width (mm) | 1.5 | .5 |
| Cell pitch (mm) | -- | 5 |
| Wafer diameter (mm) | 25 | 41 |
| Contrast ratio | 30:1 | 25:1 |
| Optical throughput(%) | 85 | 85 |

FIG. 10

Thermal properties of Cyclotene resins

| Process Step | BCB | | Photo-BCB | |
|---|---|---|---|---|
| | $\alpha$ (%) | $T_g$ (°C) | $\alpha$ (%) | $T_g$ (°C) |
| before cure | 35 | 27 | 49 | 27 |
| after exposure | — | — | 52 | 57 |
| after soft cure | 70 | 130 | 70 | 130 |
| after hard cure | >97 | >350 | >97 | >350 |

- $\alpha_g \approx 40\%$ for BCB

- $T_g$ is below room temperature.

- Supplied B-staged $\alpha_i \approx \alpha_g$ (i.e very viscous)

- In general, gelation usually takes place long before complete polymerization of the material.

- Material *maintains* its physical structure through the final cure.

- *Therefore, we can define a rigid three-dimensional structure via photolitography and potential bond it to another substrate.*

FIG. 12

Typical wafer flatness parameters: (a) warp (b) bow
(c) thickness (d) total thickness variation, TTV
(e) total indicator reading, TIR
(f) focal plane deviation, FPD.
Chips and indents in wafer shown in (g).

LIQUID CRYSTAL CELL AND METHOD FOR ASSEMBLY THEREOF

BACKGROUND OF THE INVENTION

1. Field of the Invention

This invention relates generally to a method and apparatus for assembly of liquid crystal cells and specifically to a method and apparatus for assembly of liquid crystal cells with a thin, uniform cell gap.

2. Background of the Related Art

The process for assembling liquid crystal cells includes a variety of steps. These steps are discussed in several references such as the book entitled "Liquid Crystal Flat Panel Displays—Manufacturing, Science & Technology" (ISBN 0-442-01428-7) which is incorporated herein by reference.

The major steps for assembling an active matrix display include: cleaning the substrate, applying and rubbing the liquid crystal orientation film (also called the alignment layer), applying the seal, placing the spacers, laminating and sealing the top and bottom surfaces, scribing the cells (if multiple cells are on a wafer or panel), injecting the liquid crystal, and sealing the injection hole.

The present invention is primarily concerned with the steps of applying the seal, placing the spacers, and laminating and sealing the top and bottom surfaces. The conventional method for performing these steps is described in the cited reference, "Liquid Crystal Flat Panel Displays—Manufacturing, Science & Technology."

Depending on the size of the substrate and final display size, a substrate may constitute several displays and an edge seal is needed around each display. The edge seal material can be applied using either silkscreening or dispensing. Typically, silkscreening is used.

If dispensing is used, the dispense time can be matched to other process times on an assembly line and multiple heads and sequential machines allow automation of the entire process. A further advantage of dispensing the adhesive, rather than screen printing it, is that contact with the inner surface of the display is avoided, and contamination and degradation of the aligning surface is greatly reduced.

Traditional edge seal adhesives, usually epoxies, have been heat cured after screen printing. The curing removes the solvent, and the resultant B-stage material is dry to the touch, allowing plate-to-plate alignment even when plates are in contact.

Just prior to lamination, spacers are deposited on one substrate to allow a precise gap between the top and bottom surfaces. Spacers may be fibers or spheres of a uniform dimension, made either from glass or plastic. The spacers are typically applied by air scattering. Typical large area flat panel displays have a cell gap of at least 5–10 $\mu$m.

After alignment, heat and pressure are applied to cross-link the edge seal polymer. Pressure must be maintained during the cross-linking process so that proper spacing is achieved. Problems with this process include incomplete solvent removal, non-uniform pressure during curing, and movement of plates away from alignment as the seal deforms under pressure.

UV-cure epoxies have some advantages in an automated process, including the low viscosity needed for dispenser application. However, the adhesive must remain wet until the final UV curing step, which introduces some complications into the assembly process. The entire assembly equipment line must be kept in a controlled environment chamber, and plate-to-plate alignment must be accomplished without allowing the plates to touch.

After alignment, the plates are brought into contact, a sealing membrane is lowered, and the space between the plates is evacuated. Clamped together by the outside air pressure, the plates are moved to the curing station for UV exposure. After curing, the assembled plates are off-loaded into a cassette for liquid crystal injection.

FIG. 1 shows a conventional LCD 100 and FIG. 2 describes the conventional LCD assembly process. LCD 100 includes a top substrate 110, a bottom substrate 120, a top alignment layer 112, a bottom alignment layer 122, an edge seal 130, and spacers 140. It is well known to those skilled in the art that a variety of different materials may be used for each of these elements depending on the particular application. For example, top substrate 110 can be a common electrode such as Indium Tin Oxide (ITO) on glass. Bottom substrate 120 can include active circuitry for implementing the pixels of an active matrix LCD or patterned ITO in a passive matrix LCD. Alignment layers 112 and 122 can be a rubbed polymer or evaporated $SiO_x$. Edge seal 130 can be an adhesive, such as an epoxy, which is applied by screen printing or dispensing. Spacers 140 can be glass microspheres which are blown or spun on to one of the substrates to ensure a uniform cell gap.

FIG. 2 shows a method for assembling conventional LCD 100 of FIG. 1. The method begins with step 210 which involves depositing alignment layers 112 and 122 on top substrate 110 and bottom substrate 120, respectively. Step 210 is followed by step 220 which involves applying edge seal 130 to either top substrate 110 or bottom substrate 120. Edge seal 130 can be applied either by screen printing or dispensing and defines the optically active area of conventional LCD 100. The method continues from step 220 to step 230 which involves applying spacers 140, by blowing or spinning, to either top substrate 112 or bottom substrate 122. The method progresses from step 230 to step 240 which involves attaching top substrate 110 and bottom substrate 120 with uniform pressure to achieve the desired cell gap. The method continues from step 240 to step 250 which involves curing edge seal 130. The method progresses from step 250 to step 260 which involves filling the cell with liquid crystal. The method continues from step 260 to step 270 which involves sealing the cell.

There are numerous disadvantages related to the traditional method of assembling LCDs as shown in FIG. 2. Traditional LCD assembly techniques, such as microsphere spacer application and screen printing glue are not conducive to the assembly of high-definition miniature LCDs. As the pixel pitch decreases below 20 $\mu$m, microsphere clustering and diameter nonuniformities can result in severe performance degradation.

Furthermore, the screen printing or dispensing of an adhesive edge seal on the substrate is a technique borrowed from the flat panel community. The edge seal tends to bleed (spread out) and is hard to apply precisely resulting in glue encroachment onto the aperture. The amount of bleeding is typically two to three times the originally printed width. As the width of the edge seal is decreased, the effects of glue bleed become more pronounced. This translates into wasted silicon area and/or poor assembly yield. The trade-off between circuit and assembly yield is compromised by limiting the number of displays that can be fabricated on an individual wafer.

Additionally, the separate steps of applying the edge seal and applying the spacers increases the manufacturing complexity and reduces the uniformity of the process. This disadvantage is particularly important in the assembly of miniature LCDs which require a small cell gap. Obtaining uniform performance of large area displays also requires that the cell gap between the two plates be very closely controlled. This is especially true for STN displays, where the cell gap may be only 5 μm and gap tolerance is ±100 nm or even less. This introduces extreme requirements for uniformity of spacer size and for reproducibility of positioning the plates prior to curing.

There have been numerous attempts to solve problems associated with LCD assembly. For example, Gurtler (U.S. Pat. No. 3,909,930 issued Oct. 7, 1975) discloses a method for fabricating a liquid crystal display device involving providing a photopolymeric layer (a polyester with a photosensitizer added) with a cavity in the middle for electrodes. Gurtler teaches the use of photopolymeric material, such as RISTON, to achieve a cell gap of 12.5 μm (0.0005 inches). Gurtler specifically discloses the heating of the photopolymeric material u4ntil it flows to seal the edges.

Unfortunately, Gurtler is not able to solve the above-mentioned problems because the selection of materials such as RISTON does not provide the thin, uniform cell gap required in modern LCD assembly. A cell gap of 12.5 μm along with the bleeding of the edge seal material is simply not acceptable in many modern applications, such as the assembly of miniature LCDs. These applications typically require a small cell gap, e.g. <4 μm, within a tight tolerance such as ±100 nm, and with no bleeding of the edge seal material.

Swirbel (U.S. Pat. No. 5,515,191 issued May 7, 1996) and Williams et al (U.S. Pat. No. 5,378,298 issued Jan. 3, 1995) are more recent attempts at solving some of the above-mentioned problems. Swirbel discloses an LCD with spacer material 27 formed on metal conductors 16 which are connected to a series of elements or pixels 13 as shown in FIGS. 1 and 3. Williams et al complements Swirbel by disclosing that the spacer material 27 can be made of an acrylic adhesive (such as LOCTITE 352) which is UV curable. Williams et al evaluates a variety of materials for use as the adhesive material and displays the results in tabular format. Example 1 uses LOCTITE 352 as the adhesive resulting in a cell gap of 10–12 μm.

Both Swirbel and Williams et al, evaluated either alone or in combination, still fail to solve all of the above-mentioned problem. A cell gap of 10–12 μm is simply too large for many modern applications such as assembly of miniature LCDs. These modern applications require a small cell gap within a tight tolerance, and with no bleeding of the edge seal material.

A method for easily and inexpensively assembling liquid crystal cells with a small cell gap, for example <4 μm, will result in the following advantages. Any reduction in the cell gap is directly related to the field strength across the liquid crystal. For example, in applications requiring a low operating voltage for the LCD, if the cell gap is decreased, the operating voltage for the LCD can be decreased while still providing the same field strength to the liquid crystal. This is a significant advantage for applications involving miniature LCDs, since these devices are frequently portable and battery powered.

On the other hand, some applications require a stronger field to allow faster switching time. For example, a portable color LCD TV with separate RGB frames presented sequentially requires a 180 Hz frame rate (3×60 Hz). A stronger field allows faster switching, but it also consumes more power. However, if the power is held constant, the field strength can be increased by simply decreasing the cell gap. This allows the use of portable, battery-powered LCDs in applications requiring fast switching times.

Additionally, the field within the liquid crystal is related to the resolution of the LCD because of the effects of fringing fields between pixels. This effect is particularly important in high resolution applications in which the pixels may be spaced at distances less than 1 μm. If the cell gap is decreased, the LCD will have a reduction in field interference between neighboring pixels which allows the pixels to be more closely spaced. This closer spacing of pixels produces a higher resolution image on the LCD.

In addition to reducing the cell gap size to <4 μm, it is also important to reduce the deviation of the cell gap to ±100 nm. Any greater deviation causes a reduction in the resolution and contrast of the LCD. This occurs because the lack of uniformity in the cell gap across the display causes different field strengths at different pixels even if they are provided with the same input power. This is particularly apparent in applications in which a solid image (with equal voltages at all of the pixels) is displayed across the entire LCD. If the LCD has a non-uniform cell gap, the perceived image will have dark and light spots depending on the field strength. This effect is even more significant in reflective displays since the effects of the non-uniformities are doubled.

Furthermore, it is advantageous to reduce the amount of bleeding (or spreading) of the edge seal. This is important because using an edge seal which can be applied precisely without bleeding results in maximization of the available die space for imaging.

Because of these advantages, there is a need for a new method and apparatus for assembly of liquid crystal cells with a thin, uniform cell gap.

The above references are incorporated by reference herein where appropriate for appropriate teachings of additional or alternative details, features and/or technical background.

SUMMARY OF THE INVENTION

The present invention provides a method and apparatus for assembly of liquid crystal cells with a thin, uniform cell gap which solves the problems described above.

Accordingly, an object of the present invention is to provide a method and apparatus for assembly of liquid crystal cells with a thin cell gap, for example <4 μm.

Another object of the invention is to provide a liquid crystal cell apparatus with a thin, uniform cell gap, with a deviation of ±100 nm.

An additional object of the invention is to provide a liquid crystal cell apparatus with a thin, uniform cell gap which does not bleed or spread out.

An advantage of the present invention is that a reduced cell gap allows lower power operation, faster switching, and higher resolution with reduced inter-pixel interference.

Another advantage of the present invention is that a smaller deviation of the cell gap provides better resolution and contrast by ensuring uniformity among pixels.

An additional advantage of the present invention is that a thin, uniform cell gap which does not bleed or spread out allows greater maximization of die space.

A feature of the present invention, in accordance with one embodiment, is that it is applicable to a variety of nematic liquid crystals including twisted nematic (TN), super twist nematic (STN), electrically controlled birefringence (ECB), hybrid field effect (HFE), surface mode devices including the pi cell (for example with fluids such as ZLI 1565), zero-twist mode devices, hybrid mode effect devices, and polymer dispersed liquid crystals (PDLCs).

A feature of the present invention, in accordance with another embodiment, is that it is applicable to a variety of smectic liquid crystal devices including SmC (surface stabilized, volume stabilized, binary, or analog), SmA electroclinic, distorted helix ferroelectric, anti-ferroelectric, flexoelectric, and ferroelectric.

A feature of the present invention, in accordance with another embodiment, is that it is applicable to a wide variety of displays such as projection systems (front and rear projection) for professional (head-up displays in cars, trucks and airplanes) commercial (boardroom projectors, desktop computing) and consumer (home theater, handheld games, arcade games (3D and 2D)) applications, and direct view displays including laptop displays, handheld pagers, personal display assistants, global positioning displays, instrumentation (oscilloscopes, spectrum analyzers, etc.), web browsers, telecommunicators, and head-mounted displays for virtual reality, augmented reality, portable wearable computers and simulators.

Another feature of the present invention is the use of a photo-definable polymeric resin, such as bisbenzocyclobutene (BCB), as an edge seal and a spacer.

An additional feature of the present invention is production of a cell gap <4 $\mu$m with a deviation of ±100 nm.

These and other objects, advantages and features can be accomplished in accordance with the present invention by the provision of a method for assembling liquid crystal cells having a thin, uniform cell gap, comprising the steps of: diluting a photo-definable polymeric resin with a solvent; applying the diluted photo-definable polymeric resin on a substrate; patterning the diluted photo-definable polymeric resin by selective exposure to a light; and selectively removing portions of the diluted photo-definable polymeric resin based upon exposure to the light resulting in a resin pattern.

Additional objects, advantages, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 3A and 3B show a method and an apparatus, respectively, according to one embodiment of the invention, for assembly of a liquid crystal cell with a thin, uniform cell gap.

FIGS. 8A–F show liquid crystal cell wafer patterns, according to another embodiment of the invention.

FIG. 10 shows test cell results using various materials and various cell gaps, according to an embodiment of the invention.

FIG. 12 shows a comparison of BCB and photo-BCB.

DETAILED DESCRIPTION OF PREFERRED EMBODIMENTS

Figure 1:
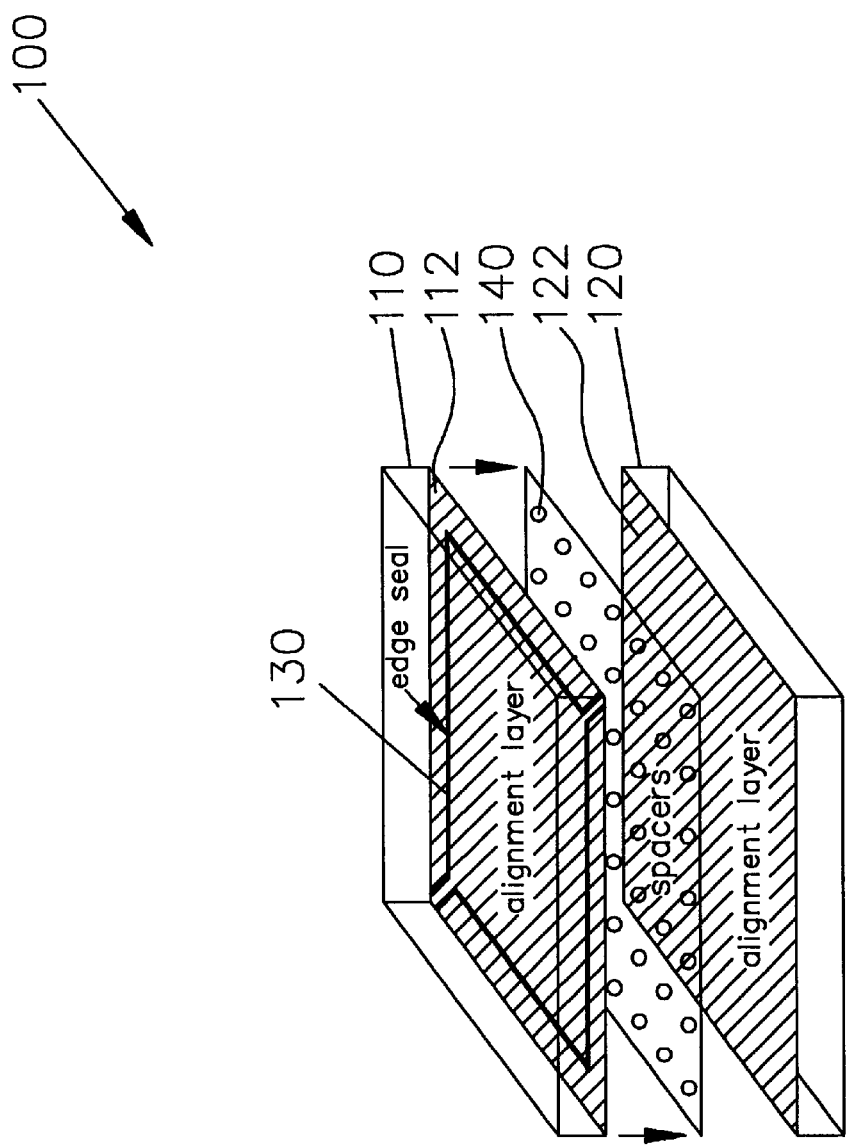
FIG. 1 shows a conventional LCD.
Figure 2:
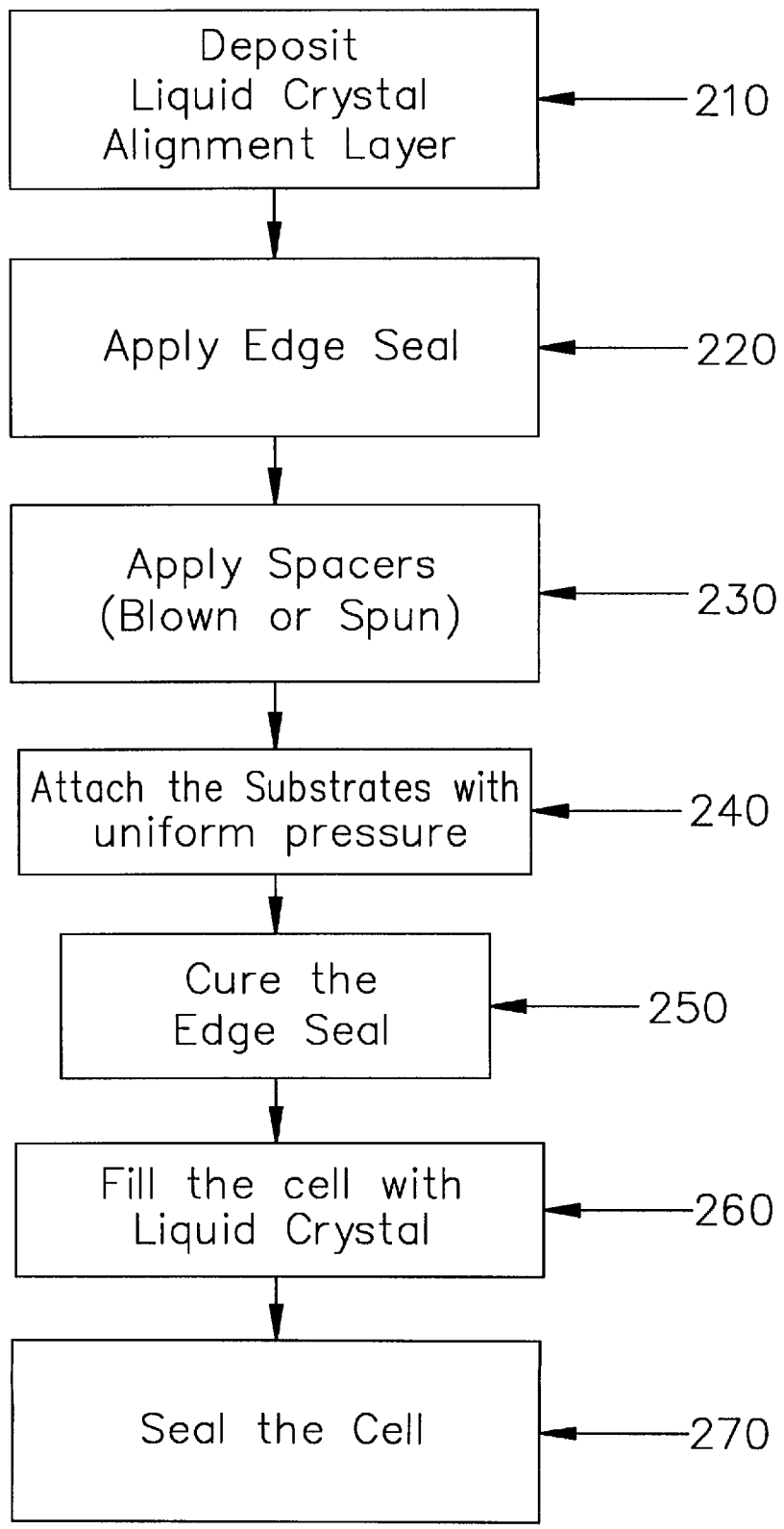
FIG. 2 shows a conventional LCD assembly process.

Because of the limitations of current methods for assembling liquid crystal cells, there is a need for a new method which allows the assembly of liquid crystal cell having a thin (<4 $\mu$m), uniform (±100 nm) cell gap, and concurrently an edge seal that does not bleed.

The present invention, according to one embodiment, provides a novel method and apparatus for assembly of liquid crystal cells with a thin, uniform cell gap. The method can be used for the assembly of either individual or multiple liquid crystal cells on a single wafer. The wafer can be a semiconductor or insulator with patterned electrodes. The method uses a photo-definable polymeric resin as both an edge seal and a spacer. The method using photo-definable polymeric resin has several important steps: spin-coating defines the cell gap, patterning defines the cell structure, and thermocompression bonding provides adhesion.

One example of a photo-definable polymeric resin for use in the invention is photo-definable bisbenzocyclobutene (photo-BCB) manufactured by Dow Chemical. In a preferred embodiment the photo-definable polymeric resin is an aromatic polymeric resin. A detailed description of the properties of BCB are contained in the Technical Note "Processing Guide for Photo-Imageable BCB" and "Research Sample Safety Data Sheet" both published by Dow Chemical which are incorporated herein by reference.

Photo-BCB is derived from the same polymer chemistry used in BCB. photo-BCB is a negative acting resin which is formulated as a high solid, low viscosity solution, which is sensitive to 365 nm light. photo-BCB exhibits excellent film retention after development and cure, with film retention values ranging from 70–90%. Furthermore, photo-BCB exhibits low moisture absorption, low dielectric constant, compatibility with copper, and thermal cure flexibility (i.e. low temperature combined with rapid cure cycles).

The invention is applicable to the assembly of high definition miniature liquid crystal displays (LCDs) of both active matrix LCD (AMLCD) or passive-matrix LCD (PMLCD) type, and the assembly of individual and integrated optic-type liquid crystal modulators.

The preferred embodiments of a method and apparatus for assembly of liquid crystal cells with a thin, uniform cell gap will now be described with reference to the accompanying figures. A more detailed discussion of technical aspects of the invention is included in Appendix A.

FIGS. 3A and 3B show a method 300 and an apparatus, respectively, according to one embodiment of the invention, for assembly of a liquid crystal cell with a thin, uniform cell gap. Method 300 includes the steps of spin coating 310, pre-baking 312, patterning 314, and developing, descuming, and post-baking 316. An additional step of curing 318 can be added although this step normally occurs after rubbing (if necessary) and alignment and assembling of the top and bottom substrates.

A further step 308 which involves diluting the photo-definable polymeric resin can be added prior to the steps of method 300. By diluting the photo-definable polymeric resin with solvents (for example Mesitylene), the resin can be applied more thinly to achieve sub-micron thin films. This effect will be shown in more detail with respect to FIG. 4.

These steps of method 300 will be described with relation to the liquid crystal cell shown in FIG. 3B.

Step 310 involves spin coating a photo-definable polymeric resin 350 on a substrate 352 to give the desired cell gap after cure and assembly. Depending on the liquid crystal cell structure, normally the liquid crystal cell has both a top substrate and a bottom substrate. Substrate 352 may be either the top or bottom substrate. For example, if substrate 352 is the bottom substrate, then photo-definable polymeric resin 350 can be applied over the circuitry of the liquid crystal cell. For example, the bottom substrate in an Active Matrix LCD (AMLCD) can be fabricated using crystalline silicon.

As another example, if substrate 352 is the top substrate, then photo-definable polymeric resin 350 can be applied over glass coated with a common electrode (e.g. Indium Tin Oxide, ITO) and an alignment layer. The spin speed used in step 310 can be adjusted to vary the thickness of photo-definable polymeric resin 350 which is used as the spacer. The final cell gap will be slightly less than the cell gap produced during step 310. From experimentation using photo-BCB, cell gap reduction due to solvent extraction (from post-bake through final cure) on the order of 20% from the original spin-on thickness has been observed.

The method proceeds from step 310 to step 312 which involves pre-baking photo-definable polymeric resin 350. For example, if using photo-BCB, a short pre-bake (2–5 minutes at 80–85° C.) can be used. Step 312 results in a partial curing of photo-definable polymeric resin 350 to drive out residual solvents which is commonly referred to as formation of a B-Stage material. The exact pre-bake time used in step 312 is dependent on the composition and size of substrate 352, as well as the exact formulation of photo-definable polymeric resin 350. Step 312 can be conducted either on a hot plate or in a box oven.

The method proceeds from step 312 to step 314 which involves patterning photo-definable polymeric resin 350. The pattern can be defined by a photomask 354 which is patterned to either expose or cover the desired final pattern, depending on whether photo-definable polymeric resin 350 is photo-negative or photo-positive, respectively. As an alternative to photomask 354, direct imaging can be used in which a moving light beam can be used to directly expose portions of photo-definable polymeric resin 350.

The light source 356 for exposing photo-definable polymeric resin 350 should include light at the proper wavelength for the material. For example, if photo-BCB is used, light source 356 can include UV light with a 350–450 nm wavelength. The result of exposing photo-definable polymeric resin 350 to light source 356 is the formation of two regions: desired photo-definable polymeric resin 350*a* and undesired photo-definable polymeric resin 350*b*.

The method proceeds from step 314 to step 316 which involves developing, descuming, and post-baking desired photo-definable polymeric resin 350*a*. If photo-definable polymeric resin 350*a* is on the bottom substrate, it should be patterned to cover the circuitry outside the display area (e.g., integrated drivers) and to define the perimeter seal as closely as possible to the display area. Developing is performed using an appropriate developer for photo-definable polymeric resin 350*a*. The exact post-bake time used in step 316 is dependent on the composition and size of substrate 352, as well as the exact formulation of photo-definable polymeric resin 350*a*. For example if photo-BCB is used, post-baking from 2–5 minutes at 80–85 degrees C is preferred. The developing results in selective removal of the undesired photo-definable polymeric resin 350*b* while leaving the desired photo-definable polymeric resin 350*a*. Descuming is performed to remove any residual organic materials. For example, descuming can be done using an oxygen plasma with typical parameters of 200–300 W at 350 mTorr for 60–120 seconds.

Patterning times and baking temperatures greatly affect the adhesion of photo-definable polymeric resin 350 and need to be derived experimentally. Upon light exposure in step 314, photo-definable polymeric resin 350 greatly increases viscosity and ceases to flow due to the photo-initiated crosslinking. As a result, photo-definable polymeric resin 350 maintains its physical structure through curing 318. With a proper photo-definable polymeric resin 350 and spin speed, patterned posts and perimeter walls will maintain the required cell gap, and upon cure 318, will serve as an adhesive.

For miniature LCD displays, method 300 has generally been discussed for using photo-definable polymeric resin 350 as both a spacer and an edge sealer, without including any photo-definable polymeric resin 350 in the display area. This is because for miniature LCD displays, the interpixel gap is typically on the order of 1 μm (for reflective displays) and the crosslinking of the resin does not permit such spacer widths without etching. However, if method 300 is applied to large flat panels, the interpixel gap increases allowing photo-definable polymeric resin 350 to be placed in the display area between pixels.

As another alternative for large flat panels, photo-definable polymeric resin 350 can be used as an edge seal and spacer in accordance with method 300 while conventional glass fibers or spheres of a uniform dimension are applied by air scattering as additional spacers over the display area.

Figure 4:
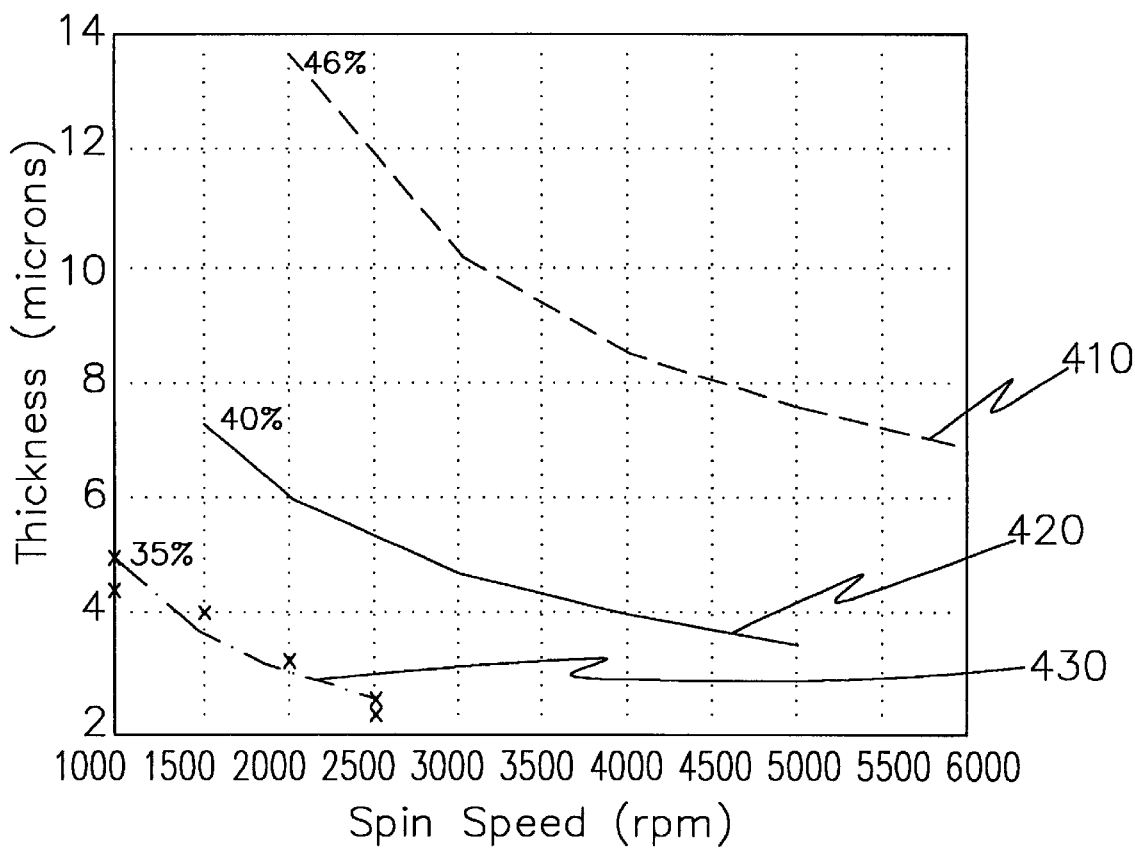
FIG. 4 shows spin curves for photo-definable BCB resins.

FIG. 4 shows a graph of spin curves for photo-definable photo-BCB resins. Curve 410 shows the performance of photo-BCB having a 46% resin content, curve 420 shows a 40% resin content, and curve 430 shows a 35% resin content. The independent axis of the graph shows spin speeds in revolutions per minute (RPM) and the dependent axis shows the resultant thickness of the photo-BCB resin in microns. A graph, such as the one shown in FIG. 4, can be used for any type of photo-definable polymeric resin to achieve a cell gap based upon the spin speed. However, there is a slight difference between the initially deposited thickness and the final thickness after curing. From experimentation using photo-BCB, cell gap reduction due to solvent extraction (from post-bake through final cure) on the order of 20% from the original spin-on thickness has been observed. It is clear from curve 430 that cell gaps of substantially less than 4 μm are achievable if 35% resin content is used. The photo-BCB can be further diluted with solvents (for example Mesitylene) to achieve sub-micron thin films.

Figure 5:
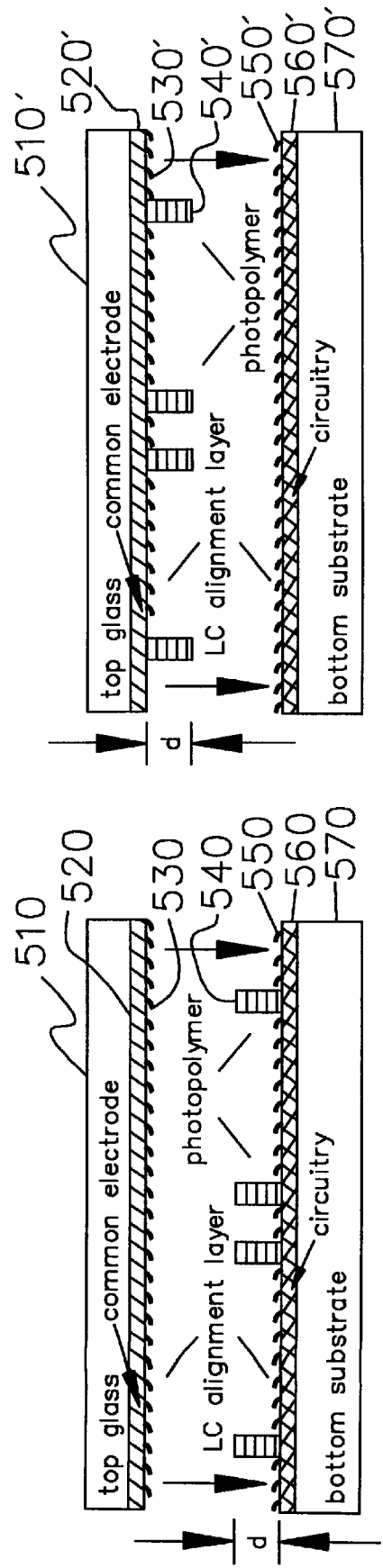
FIGS. 5A and 5B show two configurations for liquid crystal cells with a thin, uniform cell gap, according to another embodiment of the invention.

FIGS. 5A and 5B show two configurations for liquid crystal cells with a thin, uniform cell gap, according to another embodiment of the invention. In FIG. 5A, edge seal 540 is placed on the bottom substrate and in FIG. 5B edge seal 540' is placed on the top substrate. Both edge seal 540 and 540' produce a cell gap d and can be applied using method 300.

FIG. 5A shows a liquid crystal cell having a top glass 510, a common electrode 520, a top alignment layer 530, edge seal 540, a bottom alignment layer 550, circuitry 560, and a bottom substrate 570. FIG. 5B shows a liquid crystal cell having a top glass 510', a common electrode 520', a top alignment layer 530', edge seal 540', a bottom alignment layer 550', circuitry 560', and a bottom substrate 570'. The materials with common element numbers (except for the use of the prime symbol) are of common composition and will be described with respect to FIG. 5A.

It is well known to those skilled in the art that a variety of different materials can be used in a liquid crystal cell depending on the application. The following examples are provided for illustrative purposes. Top glass 510 can be a borosilicate glass that has a similar coefficient of thermal expansion (CTE) to silicon, e.g. Corning 1737F with a CTE=3.78 ppm/° C., to minimize stress during thermal cure. Common electrode 520 can be Indium Tin Oxide (ITO). Top alignment layer 530 and bottom alignment layer 550 can be a polymer or obliquely evaporated SiO and can be rubbed or not rubbed. Circuitry 560 can be any circuitry required to produce an image on the liquid crystal display. Edge sealer 540 can be any photo-definable polymeric resin, for example photo-BCB, which allows the assembly of a thin, uniform cell gap.

Figure 6:
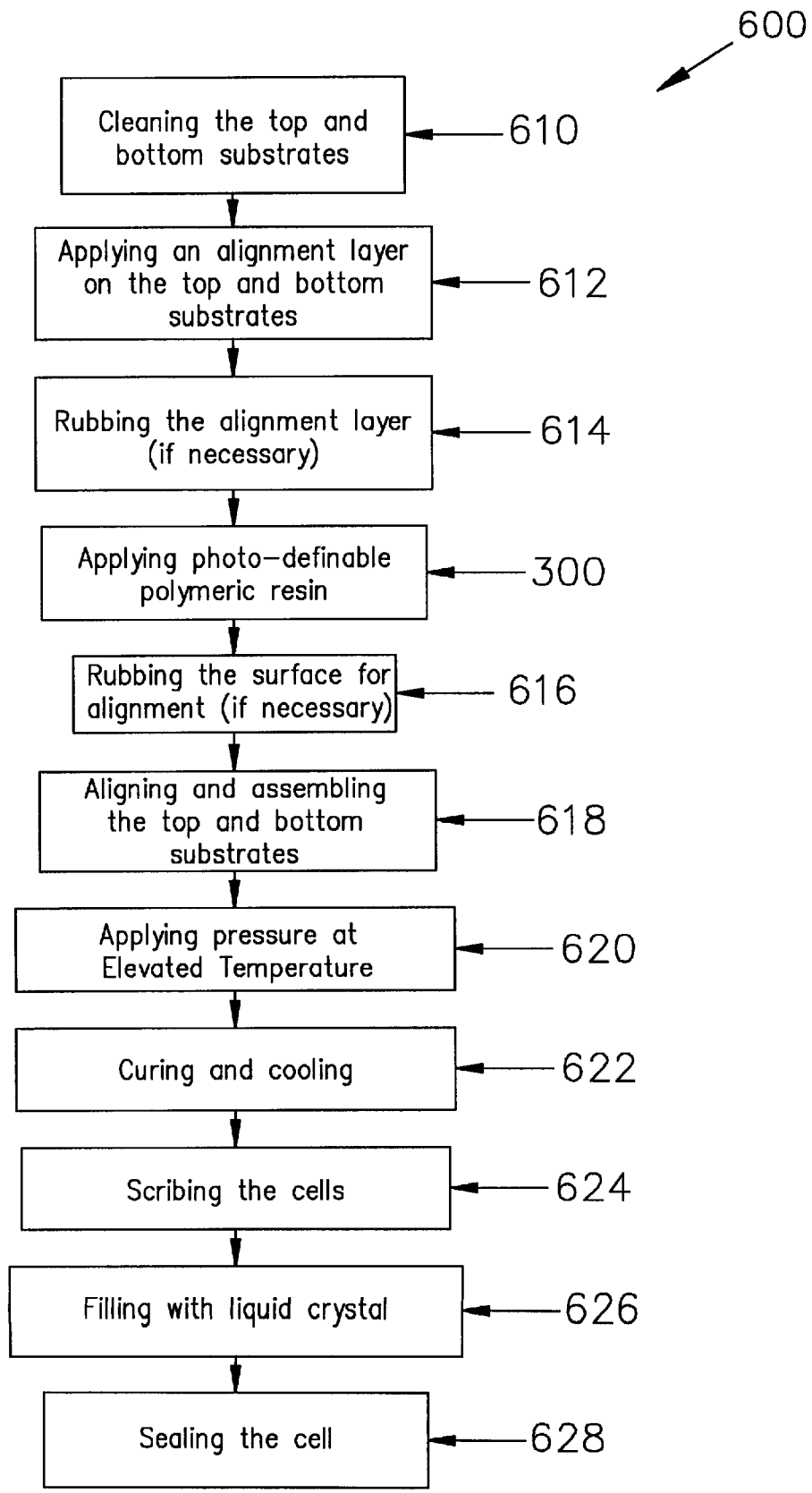
FIG. 6 shows a method, according to another embodiment of the invention, for assembly of a liquid crystal cell with a thin, uniform cell gap.

FIG. 6 shows a method 600, according to another embodiment of the invention, for assembly of a liquid crystal cell with a thin, uniform cell gap. Method 600 includes the following steps: cleaning the top and bottom substrates 610; applying a respective alignment layer on the top and bottom substrates 612; rubbing the respective alignment layers 614; applying photo-definable polymeric resin 300 (this method was previously described with regard to FIG. 3A); rubbing the surface for alignment 616; aligning and assembling the top and bottom substrates 618; applying pressure 620; curing and cooling 622; scribing the cells 624; filling with liquid crystal 626; and sealing the cell 628.

Method 600 begins with step 610 which involves cleaning the top and bottom substrates. Method 600 proceeds from step 610 to step 612 which involves applying a respective alignment layer on the top and bottom substrates. A variety of alignment layers materials can be used, for example, conventional rubbed polyimide (PI) as well as non-invasive alignment techniques, such as evaporated $SiO_x$, spin-on homeotropic materials and photosensitive polyimides. The order of step 612 depends on the application, since the alignment layer can be deposited before or after the patterning of the spacers, step 300. The process chronology is dependent on several parameters including the size of the display or cell, pixel pitch, cell gap, liquid crystal alignment material and liquid crystal material. The alignment layer can be patterned or printed in the display area, if necessary, for better adhesion. In the current method, step 612 is shown prior to step 300 in order to avoid spin coating over the patterned posts.

Method 600 continues from step 612 to step 614 which involves rubbing the respective alignment layers, if necessary. For AMLCD displays, rub-free alignment techniques minimize electrostatic discharge and physical damage to the silicon backplane.

Method 600 proceeds from step 614 to step 300 which involves applying photo-definable polymeric resin, for example photo-BCB. Step 300 was already discussed in detail in relation to FIG. 3A.

Method 600 proceeds from step 300 to step 616 which involves rubbing the surface again for alignment, if necessary. Please note that the exact order of step 616 can be modified based upon empirical data for the application.

Method 600 proceeds from step 616 to step 618 which involves aligning and assembling the top and bottom substrates. The precise method for aligning and assembling also depends on empirical data for the application. For example, the aligning and assembling can be performed on a hot plate at a typical temperature of 130° C.

Method 600 proceeds from step 618 to step 620 which involves applying pressure to the top substrate until good cell thickness and uniformity is achieved. For example, the cell gap can be visually inspected by color fringes to ensure proper cell thickness and uniformity. Step 620 generally includes the use of an elevated temperature which is near the glass transition temperature.

Method 600 continues from step 620 to step 622 which involves curing and cooling the liquid crystal cell to complete polymerization. The temperature range and time are determined empirically based on the application. For example, a typical AMLCD requires 225° C. for 90–120 minutes. The curing can be performed on a heated vacuum pack with constant pressure applied to the top surface. After thermocompression, the two substrates are bonded together. The top substrate can also be heated.

Method 600 continues from step 622 to step 624 which involves scribing the cells, if the wafer includes multiple cells. Scribe lines may need to be offset to expose the wire-bonding pads. As part of step 624, the liquid crystal cells are broken away from each other by applying tension force in the traditional manner.

Method 600 proceeds from step 624 to step 626 which involves filling the cell with liquid crystal, normally under a moderate vacuum.

Method 600 continues from step 626 to step 628 which involves sealing the liquid crystal cell.

Figure 7:
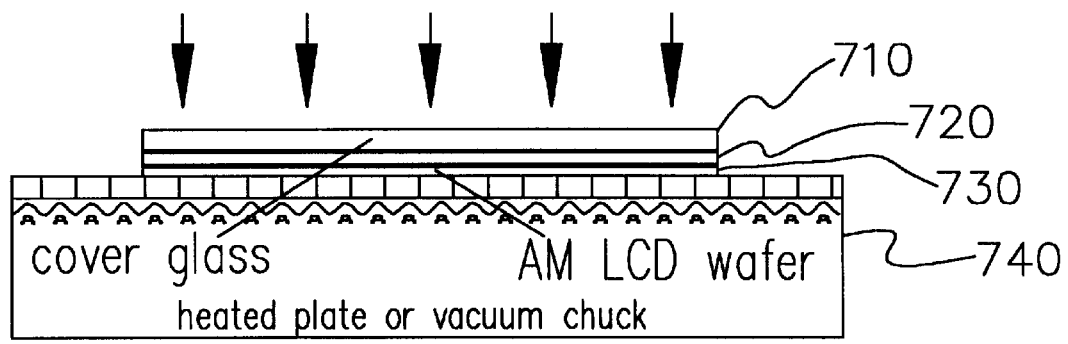
FIG. 7 shows a liquid crystal display, according to an embodiment of the invention.

FIG. 7 shows a liquid crystal cell, according to an embodiment of the invention, during steps 620 and 622. The liquid crystal cell includes a top substrate 710, and edge seal 720, and a bottom substrate 730. The liquid crystal cell has constant pressure applied from the top while heat is applied from a heated plate or vacuum chuck 740. Heat can also be applied to the top substrate. This may be required if the bottom substrate is not thermally conductive.

Figure 8A:
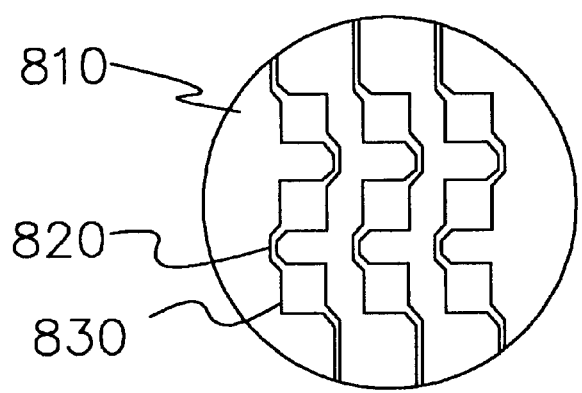
Figure 8B:
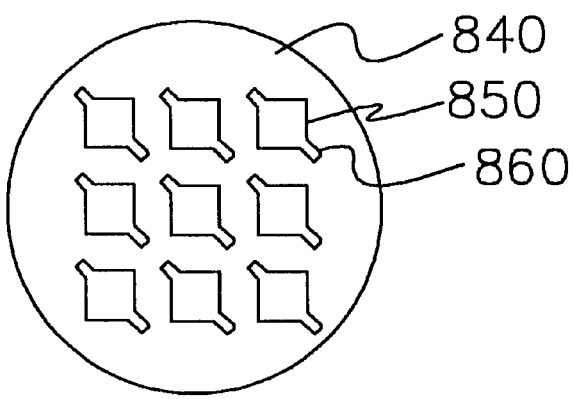

FIGS. 8A–F show liquid crystal cell wafer patterns, according to another embodiment of the invention. FIG. 8A shows a wafer 810 which has several liquid crystal cells 830 with vias 820. After scribing the cells, the holes left at vias 820 are used to fill liquid crystal cell 830 with liquid crystal. FIG. 8B shows a wafer 840 which has several liquid crystal cells 850 with a fill hole 860 which is used to fill liquid crystal cell 850 with liquid crystal.

FIG. 8C shows a rectangular VGA die mask having a 0.7" diameter. Although each cell has two fill holes, generally a single fill hole is used. FIG. 8D shows a rectangular VGA die mask similar to the one shown in FIG. 8C except for the inclusion of a single fill hole for each cell.

Figure 8E:
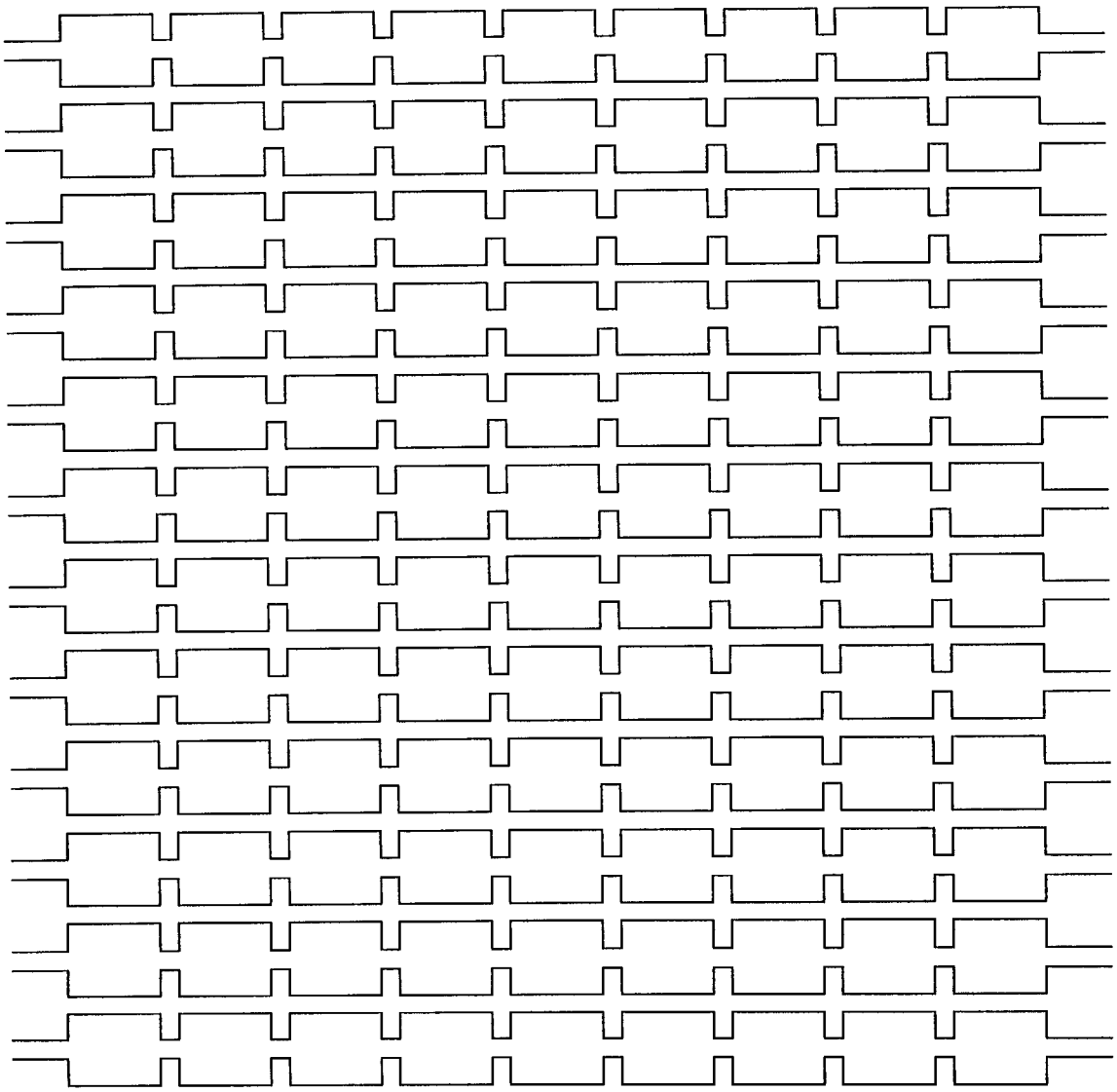
Figure 8F:
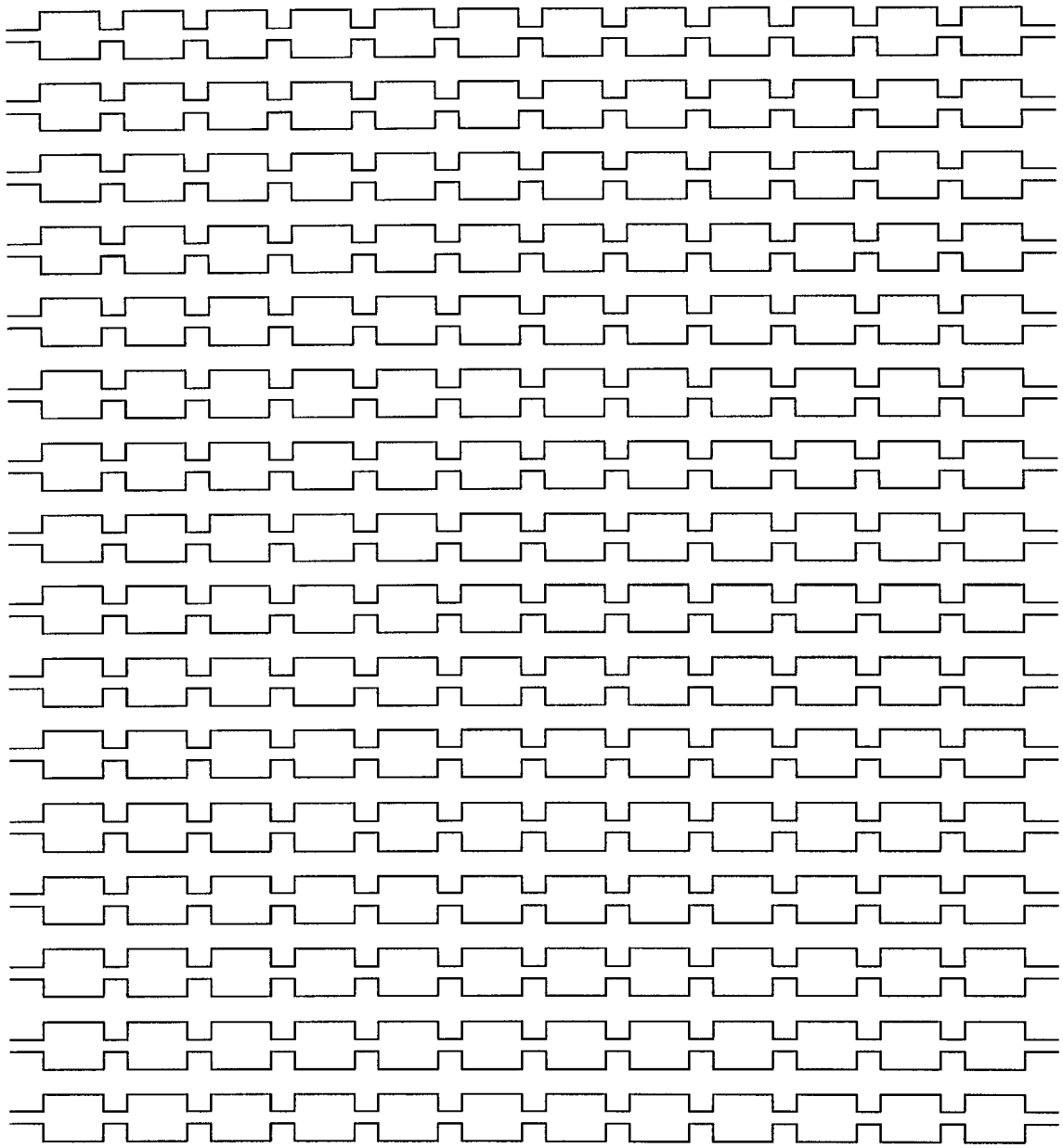

FIGS. 8E and 8F show a 2" wafer mask having rectangular cells with a 0.35" and 0.25' diagonal, respectively. Each cell has two fill holes, but generally only one fill hole is used.

Figure 9:
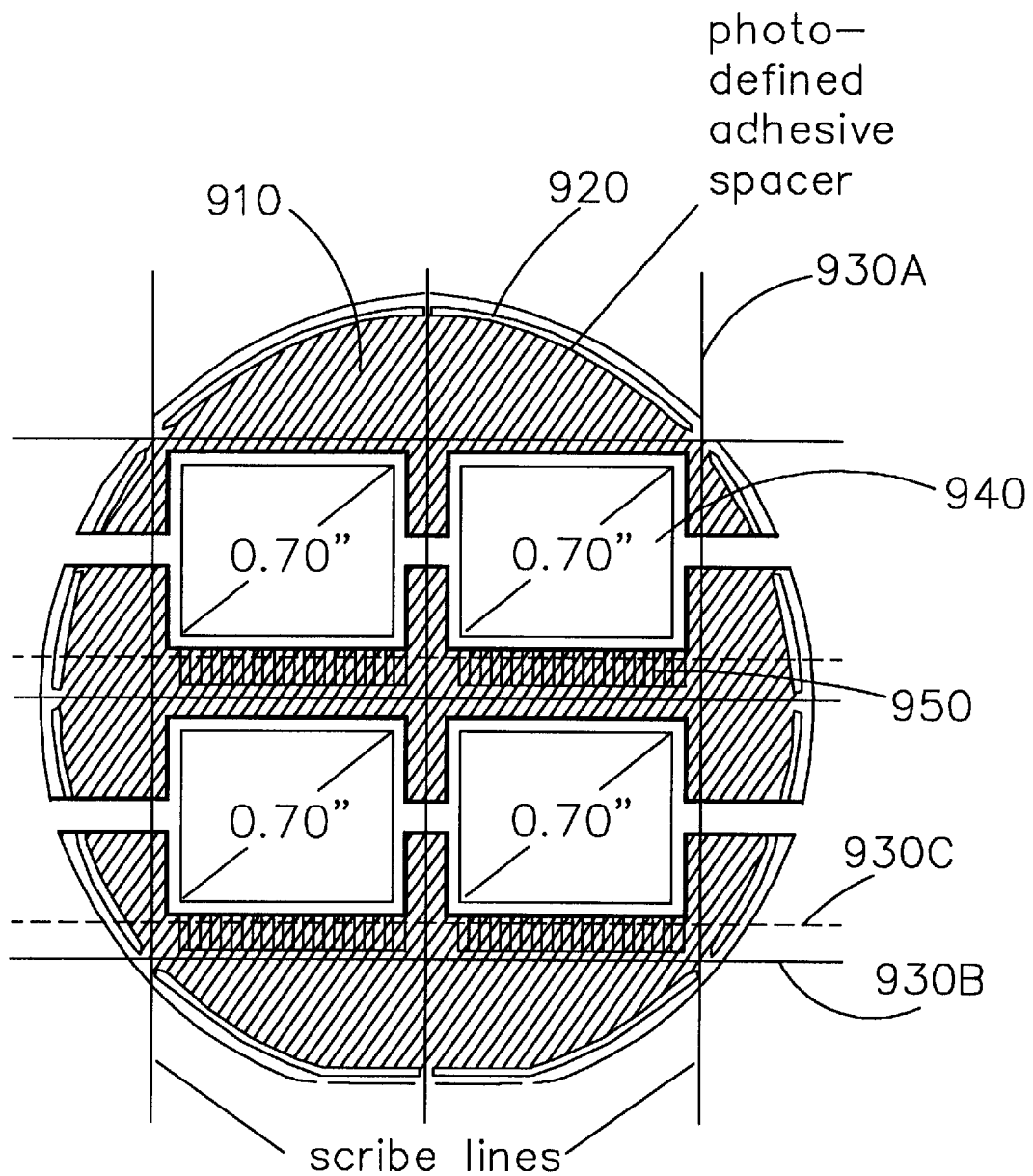
FIG. 9 shows a silicon wafer with several liquid crystal displays, according to a further embodiment of the invention.

FIG. 9 shows a wafer with several liquid crystal displays, according to a further embodiment of the invention. A wafer 910 includes edge sealer 920, vertical scribe lines 930A, bottom substrate horizontal scribe lines 930B, top substrate horizontal scribe lines 930C, numerous liquid crystal cells 940, and bonding pads 950. As an example, wafer 910 can be a 2" Si wafer consisting of four 0.7" diagonal miniature liquid crystal cells 940. The vertical scribe lines 930A are positioned the same for the bottom and top substrates. However, top substrate horizontal scribe lines 930C and bottom substrate horizontal scribe lines 930B are offset to expose bonding pads 950. Around the perimeter of wafer 910, there is edge sealer 920 which acts as a spacer to minimize edge effects during thermocompression bonding. Photo-resin can be applied in other non-display areas for increased support through a scribe and break.

FIG. 10 shows test cell results using various materials and various cell gaps, according to an embodiment of the invention. The results are in tabular format indicating the material used, the assembly parameters, and various figures of merit. The materials used are BDH-E7 and ZLI2140-100. These results demonstrate that with all of the tested material, cell gap sizes in the 0.9–1.9 $\mu$m range were obtained.

An individual cell was fabricated by the described process using photo-BCB adhesive spacers on a $SiO_x$ alignment layer. The cell had a 0.6" inner diagonal with a 1.5 mm wide edge seal, and was filled with a nematic LC and tapped to 0.9 $\mu$m. For the liquid crystal alignment layer, 200 Å of SiOx was obliquely evaporated at 30° C. on both substrates to provide zero pre-tilt alignment. The test cell demonstrates excellent compatibility between the $SiO_x$ alignment layer and photo-BCB chemical and thermal processing ($T_{max}$= 200–250° C.). The contrast ratio of the test cell was 30:1 with an optical throughput of 85%.

A multiple cell glass wafer was fabricated with a 6×6 square grid of 2.5 mm inner diameter cells (0.5 mm edge seal) on a 5 mm pitch. The top and bottom substrates are 1.1 mm thick, 1.6" diameter borosilicate glass (Corning 7059) wafers coated with indium tin oxide (ITO). A liquid crystal alignment layer of rubbed polyimide (Nissan SE610) was deposited on both substrates. All 36 cells were assembled at once and cell gapped to 1.9 $\mu$m. As a result of thermocompression bonding, the perimeter spacer height is reduced by 20% from the expected after-cure thickness as predicted from the spin curves. The multiple cell demonstrates the ability to assemble many LC cells at once. To examine the liquid crystal alignment, the entire wafer was filled with a nematic liquid crystal mixture (Merck ZLI 2140-100) with a birefringence of $\Delta n$=0.13. The cell demonstrates fair compatibility between the polyimide alignment layer and the photo-BCB. This can be perfected via post rubbing.

Figure 11:
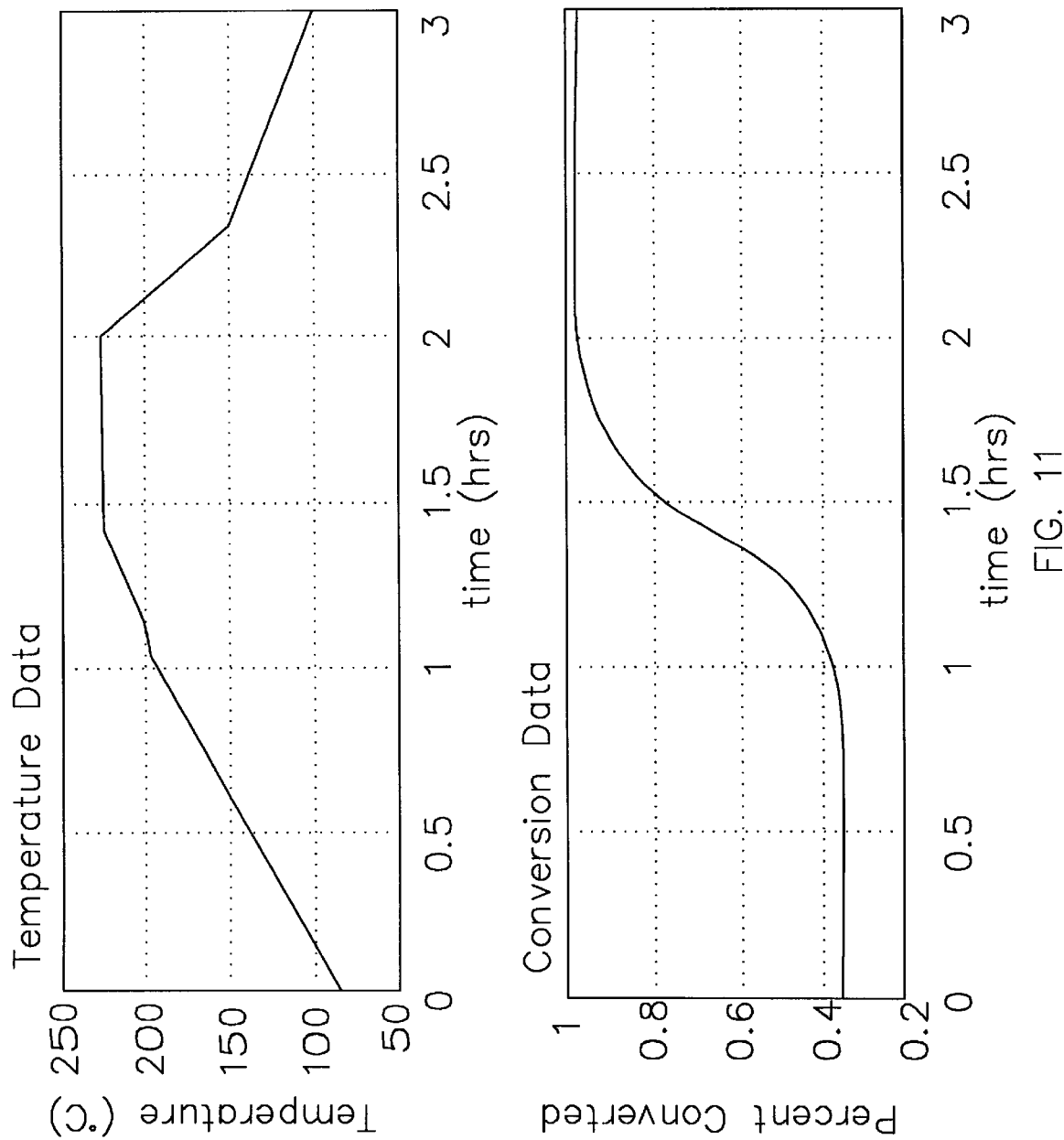
FIG. 11 shows an example hard cure temperature schedule for photo-BCB.

FIG. 11 shows an example hard cure temperature schedule for photo-BCB. FIG. 11 includes two graphs: one showing time (in hours) versus Temperature (° C.) and the second showing time (in hours) versus the percent of resin conversion. These curves are representative data related to the performance of photo-BCB.

FIG. 12 shows a comparison of BCB and photo-BCB. Although most of the previous discussion was related to photo-BCB, standard BCB can also be used in the method, according to a further embodiment of the invention. For example, if BCB is soft baked to advance it to the same point of polymerization as photo-BCB (approximately 52%), the BCB can then be patterned by photo-resist and either wet or dry etched.

Figure 13:
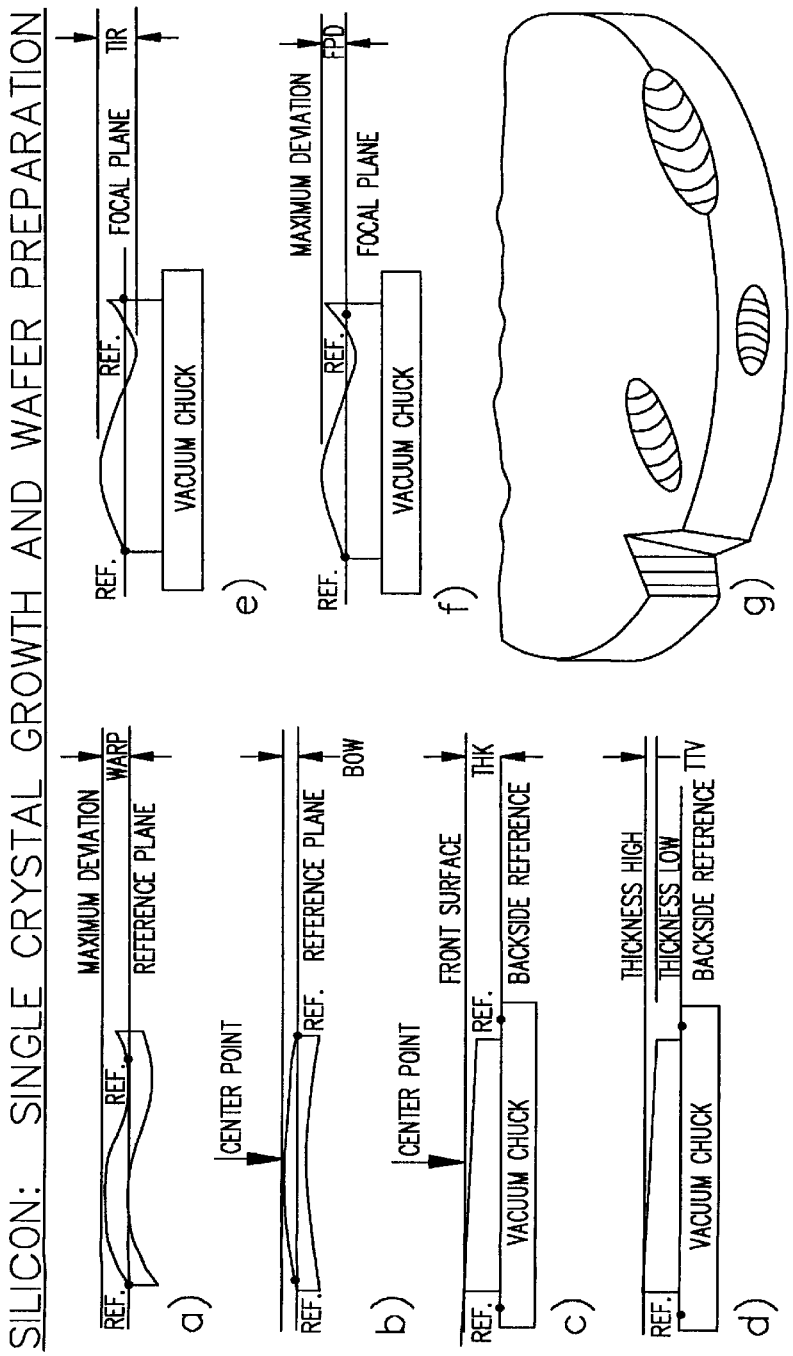
FIG. 13 shows typical parameters related to wafer flatness.

FIG. 13 shows typical parameters related to wafer flatness. Current experimentation regarding the uniformity of the cell gap has been conducted using standard glass. If a more optically flat glass is used, then the uniformity can be increased. In other words, a substantial portion of the deviation in the cell gap is related to lack of flatness in the substrate rather than lack of uniformity in the spacer.

Although many of the examples have referred to AMLCDs, the method according to the invention is not limited to any type of LCD technology. In fact, it is applicable to a variety of nematic liquid crystals including twisted nematic (TN), super twist nematic (STN), electrically controlled birefringence (ECB), hybrid field effect (HFE), surface mode devices including the pi cell (for example with fluids such as ZLI 1565), zero-twist mode devices, hybrid mode effect devices, and polymer dispersed liquid crystals (PDLCs).

The method is also applicable to a variety of smectic liquid crystal devices including SmC (surface stabilized, volume stabilized, binary, or analog), SmA electroclinic, distorted helix ferroelectric, anti-ferroelectric, flexoelectric, and ferroelectric.

The method is applicable to emissive displays, for example deformable mirrortype or Fabry-Perot-type, or micro-electro-mechanical displays that require a thin, uniform gap.

Furthermore, the invention is applicable to a wide variety of displays such as projection systems (front and rear projection) for professional (head-up displays in cars, trucks and airplanes) commercial (boardroom projectors, desktop computing) and consumer (home theater, handheld games, arcade games (3D and 2D)) applications, and direct view displays including laptop displays, handheld pagers, personal display assistants, global positioning displays, instrumentation (oscilloscopes, spectrum analyzers, etc.), web browsers, telecommunicators, and head-mounted displays for virtual reality, augmented reality, portable wearable computers and simulators.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for assembling liquid crystal cells having a thin, uniform cell gap, comprising the steps of:

diluting a photo-definable polymeric resin with a solvent;

applying the diluted photo-definable polymeric resin on a substrate;

patterning the diluted photo-definable polymeric resin by selective exposure to a light; and selectively removing portions of the diluted photo-definable polymeric resin that were not exposed to the light, resulting in a viscous, uncured resin pattern that will maintain its physical structure during thermal curing, and that is adapted to serve as a spacer, an edge seal and an adhesive upon thermal curing.

2. The method for assembling of claim 1, wherein the solvent is mesitylene.

3. The method for assembling of claim 1, wherein the step of applying includes spin coating.

4. The method for assembling of claim 3, wherein a speed of the spin coating determines a thickness of the thin, uniform cell gap.

5. The method for assembling of claim 1, wherein the step of applying includes roll coating.

6. The method for assembling of claim 1, wherein the diluted photo-definable polymeric resin has less than a 40% resin content.

7. The method for assembling of claim 1, wherein the diluted photo-definable polymeric resin has not greater than a 35% resin content.

8. The method for assembling of claim 1, wherein the thin, uniform cell gap has a thickness less than 4 $\mu$m.

9. The method for assembling of claim 1, wherein the thin, uniform cell gap has a uniformity of ±100 nm.

10. The method for assembling of claim 1, wherein the substrate is a top substrate.

11. The method for assembling of claim 10, wherein the top substrate is Indium Tin Oxide (ITO) on glass.

12. The method for assembling of claim 1, wherein the substrate is a bottom substrate.

13. The method for assembling of claim 12, wherein the bottom substrate is a crystalline silicon.

14. The method for assembling of claim 1, wherein the light is a UV light with a 350–450 nm wavelength.

15. The method for assembling of claim 1, comprising the further step of further applying an additional spacer material.

16. The method for assembling of claim 1, wherein said step of selectively removing portions includes developing, descuming, and post-baking the diluted photo-definable polymeric resin.

17. The method for assembling of claim 1, comprising the further step of:

pre-baking the diluted photo-definable polymeric resin.

18. The method for assembling of claim 1, comprising the further steps of:

applying and aligning an additional substrate;

applying pressure at an elevated temperature to at least one of the substrate and the additional substrate; and thermally curing the resin pattern;

wherein the cured resin pattern adheres the substrates together, serves as a spacer between the substrates and forms an edge seal.

19. A liquid crystal cell, comprising:

a bottom substrate;

a top substrate arranged above said bottom substrate; and a diluted photo-defined, thermally cured polymeric resin adhering the bottom substrate to the top substrate, providing a thin uniform cell gap and also serving as a spacer and an edge seal wherein the photo-definable polymeric resin is photo-BCB.

20. The liquid crystal cell of claim 19, wherein said diluted photo-defined polymeric resin includes a solvent.

21. The liquid crystal cell of claim 20, wherein said solvent comprises mesitylene.

22. The liquid crystal cell of claim 19, wherein said diluted photo-defined polymeric resin has less than a 40% resin content.

23. The liquid crystal cell of claim 19, wherein said diluted photo-defined polymeric resin has not greater than a 35% resin content.

24. The liquid crystal cell of claim 19, wherein said thin, uniform cell gap has a thickness less than 4 µm.

25. The liquid crystal cell of claim 19, wherein said thin, uniform cell gap has a uniformity of ±100 nm.

26. The liquid crystal cell of claim 19, wherein said top substrate is a common electrode.

27. The liquid crystal cell of claim 19, wherein said top substrate is Indium Tin Oxide (ITO) on glass.

28. The liquid crystal cell of claim 19, wherein said bottom substrate is a crystalline silicon.

29. The liquid crystal cell of claim 19, further comprising an additional spacer material.

30. The liquid crystal cell of claim 19, wherein the liquid crystal cell is one of a plurality of liquid crystal cells on a wafer.

* * * * *